(12) United States Patent
Yoo

(10) Patent No.: US 11,656,576 B2
(45) Date of Patent: May 23, 2023

(54) APPARATUS AND METHOD FOR PROVIDING MAPPING PSEUDO-HOLOGRAM USING INDIVIDUAL VIDEO SIGNAL OUTPUT

(71) Applicant: BIBIMBLE, Seoul (KR)

(72) Inventor: Mi Ran Yoo, Seoul (KR)

(73) Assignee: BIBIMBLE, Seoul (KR)

( * ) Notice: Subject to any disclaimer, the term of this patent is extended or adjusted under 35 U.S.C. 154(b) by 547 days.

(21) Appl. No.: 16/411,747

(22) Filed: May 14, 2019

(65) Prior Publication Data

US 2019/0265644 A1 Aug. 29, 2019

Related U.S. Application Data

(63) Continuation of application No. PCT/KR2018/014918, filed on Nov. 29, 2018.

(30) Foreign Application Priority Data

Dec. 18, 2017 (KR) ........................ 10-2017-0173953

(51) Int. Cl.
*G03H 1/00* (2006.01)
*G02B 27/01* (2006.01)
*G03H 1/02* (2006.01)
*G03H 1/04* (2006.01)
*G06T 19/00* (2011.01)
(Continued)

(52) U.S. Cl.
CPC ......... *G03H 1/0005* (2013.01); *G02B 27/017* (2013.01); *G03H 1/02* (2013.01); *G03H 1/04* (2013.01); *G06T 5/50* (2013.01); *G06T 15/08* (2013.01); *G06T 19/006* (2013.01);
(Continued)

(58) Field of Classification Search
None
See application file for complete search history.

(56) References Cited

U.S. PATENT DOCUMENTS

2010/0067075 A1* 3/2010 Schwerdtner ............ G03H 1/08
359/9
2015/0362734 A1* 12/2015 Moser .................. G03H 1/0252
359/3

(Continued)

FOREIGN PATENT DOCUMENTS

EP 3206122 8/2017
JP 2014010326 1/2014
(Continued)

*Primary Examiner* — Kee M Tung
*Assistant Examiner* — Jed-Justin Imperial
(74) *Attorney, Agent, or Firm* — Cantor Colburn LLP

(57) ABSTRACT

A method for presenting a mapping pseudo-hologram using individual video signal output of a real-time engine according to an embodiment of the present disclosure includes: (a) creating a partial viewpoint video including a character of a virtual reality content corresponding to a first user through a camera positioned at any one point in the virtual reality content; (b) creating a hologram video including at least one of objects around the character in the partial viewpoint video; and (c) projecting the hologram video onto a hologram screen placed between the first user and a second user different from the first user, and in the process (c), the hologram video is projected to be overlaid on the first user when the second user sees the first user.

3 Claims, 4 Drawing Sheets

(51) Int. Cl.
*G06T 19/20* (2011.01)
*G06T 5/50* (2006.01)
*G06T 15/08* (2011.01)

(52) U.S. Cl.
CPC .......... *G06T 19/20* (2013.01); *G06T 2200/04* (2013.01); *G06T 2200/21* (2013.01); *G06T 2211/421* (2013.01)

(56) References Cited

U.S. PATENT DOCUMENTS

| | | | |
|---|---|---|---|
| 2016/0027218 A1* | 1/2016 | Salter | G02B 27/017 345/633 |
| 2017/0169610 A1 | 6/2017 | King | |
| 2018/0088334 A1* | 3/2018 | Aoki | G02B 27/017 |
| 2018/0308024 A1* | 10/2018 | Kilner | G02B 27/017 345/633 |

FOREIGN PATENT DOCUMENTS

| | | |
|---|---|---|
| KR | 20150055121 | 5/2015 |
| KR | 20150105340 | 9/2015 |
| KR | 20150108842 | 9/2015 |
| KR | 20170058669 | 5/2017 |

\* cited by examiner

APPARATUS AND METHOD FOR PROVIDING MAPPING PSEUDO-HOLOGRAM USING INDIVIDUAL VIDEO SIGNAL OUTPUT

TECHNICAL FIELD

The present disclosure relates to an apparatus and method for providing a mapping pseudo-hologram by outputting an individual video signal of a real-time engine.

BACKGROUND

There has been recent development in methods of presenting contents using pseudo hologram technologies. These methods are increasingly used in various fields such as advertisement, exhibition, entertainment, and the like, and a pseudo-hologram can be implemented using holography and can be produced to be similar to a hologram by using a reflector formed of a translucent glass or other materials similar thereto.

Also, there has been great development in contents using head-mounted display (HMD) technologies. However, technologies for viewers who sees a user using a content using the HMD technologies have not been greatly developed. For example, conventionally, when a third person watches a game using the HMD technologies, he/she has to watch the game mainly from a viewpoint of a player. Thus, it is difficult for the third person to understand the game overall.

DISCLOSURE OF THE INVENTION

Problems to be Solved by the Invention

To solve the above-described problem, according to embodiments of the present disclosure, a three-dimensional pseudo hologram of a first user and his/her surroundings can be implemented to enable a second user to watch a video being seen by the first user using an apparatus like a HMD.

Means for Solving the Problems

According to an embodiment of the present disclosure, a method for presenting a mapping pseudo-hologram using individual video signal output of a real-time engine includes: (a) creating a partial viewpoint video including a character of a virtual reality content corresponding to a first user through a camera positioned at any one point in the virtual reality content; (b) creating a hologram video including at least one of objects around the character in the partial viewpoint video; and (c) projecting the hologram video onto a hologram screen placed between the first user and a second user different from the first user, and in the process (c), the hologram video is projected to be overlaid on the first user when the second user sees the first user.

According to another embodiment of the present disclosure, a server for presenting a mapping pseudo-hologram using individual video signal output of a real-time engine includes: a memory that stores at least one program; and a processor configured to execute the program, and the program includes: (a) creating a partial viewpoint video including a character of a virtual reality content corresponding to a first user through a camera positioned at any one point in the virtual reality content; (b) creating a hologram video including at least one of objects around the character in the partial viewpoint video; and (c) projecting the hologram video onto a hologram screen placed between the first user and a second user different from the first user, and the process (c) includes instructions to project the hologram video to be overlaid on the first user when the second user sees the first user.

Effects of the Invention

According to the embodiments of the present disclosure, a three-dimensional pseudo hologram of a first user and his/her surroundings can be implemented to enable a second user to watch a video being seen by the first user using an apparatus like a HMD.

BEST MODE FOR CARRYING OUT THE INVENTION

Figure 1:
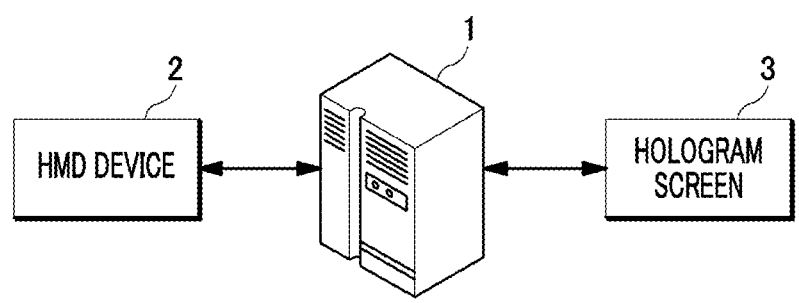
FIG. 1 is a depiction of the configuration of a system for providing a mapping pseudo-hologram using individual video signal output according to an embodiment of the present disclosure.

Hereafter, example embodiments will be described in detail with reference to the accompanying drawings so that the present disclosure may be readily implemented by those skilled in the art. However, it is to be noted that the present disclosure is not limited to the example embodiments but can be embodied in various other ways. In the drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, it is to be understood that the term "comprises or includes" and/or "comprising or including" used in the document means that one or more other components, steps, operation and/or existence or addition of elements are not excluded in addition to the described components, steps, operation and/or elements unless context dictates otherwise and is not intended to preclude the possibility that one or more other features, numbers, steps, operations, components, parts, or combinations thereof may exist or may be added.

Through the whole document, a server 1 may refer to an apparatus for providing a mapping pseudo-hologram using individual video signal output.

FIG. 1 is a depiction of the configuration of a system for providing a mapping pseudo-hologram using individual video signal output according to an embodiment of the present disclosure.

Referring to FIG. 1, the system for providing a mapping pseudo-hologram using individual video signal output according to an embodiment of the present disclosure may include the server 1, a HMD device 2, and a hologram screen 3.

The server 1 according to an embodiment of the present disclosure may further include the HMD device 2 and a separate hardware device for control and may receive an input value and position data and supply a pseudo-hologram video to the hologram screen 3.

Herein, the server 1 may also supply virtual environment data to the HMD device 2, and the virtual environment data may include 360-degree images or videos.

Further, the HMD device 2 is an abbreviation of a head mounted display and is a kind of image display device which a user wears on his/her head like glasses to enjoy large-scale videos. The HMD device 2 may supply videos with various image qualities at various viewing angles depending on purpose of use and may further include a hardware device for control as necessary. Therefore, the specifications of the HMD device 2 do not limit the scope of the present disclosure.

The pseudo-hologram video supplied by the server 1 to the hologram screen 3 may be data configured to implement a pseudo-hologram created by holography.

The holography refers to a method of recording an interference pattern of light in a recording medium such as a film and reproduce a visible three-dimensional image, and the pseudo-hologram is implemented to be similar to a hologram that appears like a three-dimensional video by projecting a three-dimensional photo or video created by the holography onto a transflective screen or a transparent foil.

Therefore, in the present disclosure, the hologram screen 3 may refer to a transflective screen for displaying a pseudo-hologram or a pseudo-hologram reproducing apparatus functioning similarly thereto.

The HMD device 2 and the hologram screen 3 may use read-only applications to display virtual environment data and a pseudo-hologram, respectively. Herein, the read-only applications may be installed previously in the HMD device 2 and the hologram screen 3, respectively, or installed therein after downloaded from an application distribution server.

The server 1 may be connected to multiple HMD devices 2, and these HMD devices 2 may refer to communication devices that can use device applications in wired and wireless communication environments. Although FIG. 1 illustrates a diagram representing the HMD device 2, the concept of the present disclosure is not limited thereto. As described, any device in which device applications can be installed may be used without limitations. For example, a hand-held computing device or a smartphone which is not the HMD device 2 may be used together with an additional hardware device to perform the function of the HMD device. Therefore, the kinds of devices to be used as the HMD device 2 do not limit the present disclosure.

Meanwhile, the server 1 may be connected to the HMD device 2 and the hologram screen 3 via a communication network to transmit and receive data. That is, the communication network refers to a communication network configured to provide an access route that enables the HMD device 2 and the hologram screen 3 to access the server 1 and transmit and receive data. The communication network may include wired networks such as local area networks (LANs), wide area networks (WANs), metropolitan area networks (MANs), and integrated service digital networks (ISDNs) and wireless networks such as wireless LANs, CDMA, Bluetooth, and satellite communication networks, but the present disclosure is not limited thereto. The server 1 may be connected directly to the HMD device 2 and the hologram screen 3 using a graphic output module to transmit and receive data.

Figure 2:
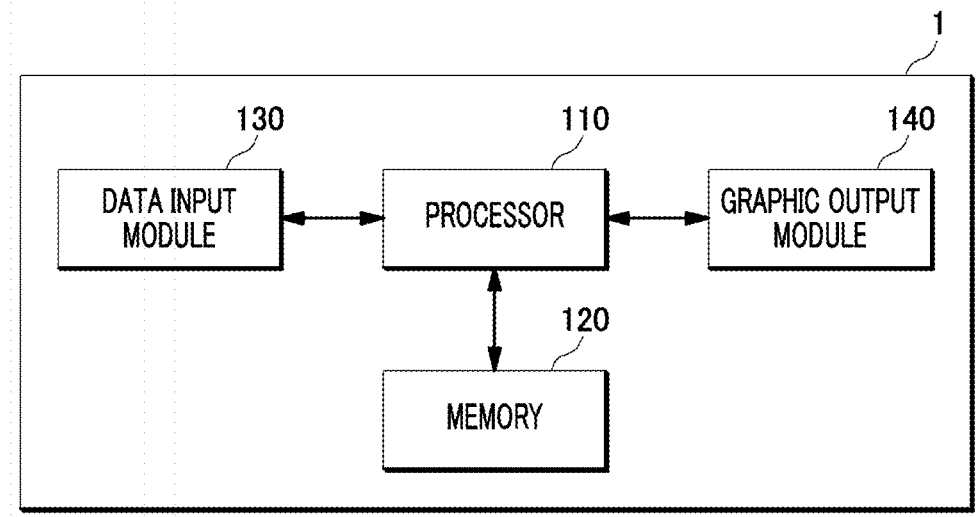
FIG. 2 is a depiction of the configuration of a server according to an embodiment of the present disclosure.

FIG. 2 is a depiction of the configuration of a server according to an embodiment of the present disclosure.

Referring to FIG. 2, the server 1 according to an embodiment of the present disclosure may include a processor 110, a memory 120, a data input module 130, and a graphic output module 140.

The graphic output module 140 is connected to the HMD device 2 and the hologram screen 3 and transfers virtual environment data and a pseudo-hologram through a wired connection, and may interwork with the communication network as necessary. The graphic output module 140 may provide an interface required to supply signals transmitted and received between the devices in a packet data format and may include hardware and software for performing such a function.

The memory 120 stores a program configured to perform a method for providing a mapping pseudo-hologram using individual video signal output. Further, the memory 120 functions to temporarily or permanently store data which are processed by the processor 110. Herein, the memory 120 may include magnetic storage media or flash storage media, but the scope of the present disclosure is not limited thereto.

The processor 110 is a kind of central processing unit and controls the overall process of providing a virtual reality video. The processes to be performed by the processor 110 will be described later with reference to FIG. 3.

Herein, the processor 110 may include all kinds of devices, e.g., a processor, capable of processing data. Herein, the term "processor" may refer to, e.g., a data processing device built in hardware, including a physically structured circuit for executing functions expressed as codes or commands included in a program. Examples of the data processing device built in hardware may include a microprocessor, a central processing unit (CPU), a processor core, a multiprocessor, an application-specific integrated circuit (ASIC), a field programmable gate array (FPGA), and the like, but the scope of the present disclosure is not limited thereto.

The data input module 130 is configured to receive an input value input by an external hardware device or a hardware device for control included in the HMD device 2. The input value received by the data input module 130 may vary depending on purpose of use of the device and thus is not limited in the present disclosure. However, the input value must include a coordinate value for sensing a position of a user.

Figure 3:
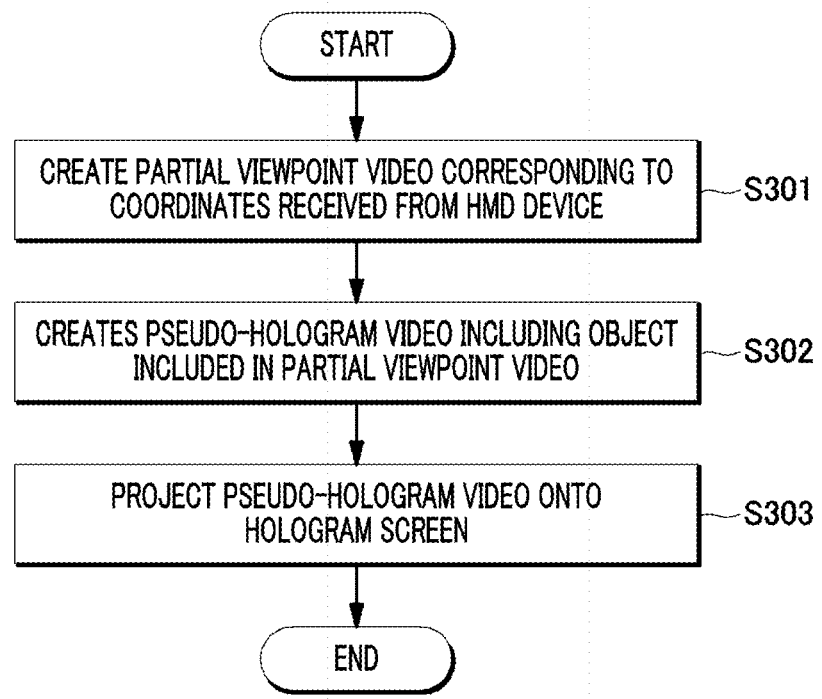
FIG. 3 is a flowchart showing a method for providing a mapping pseudo-hologram using individual video signal output according to an embodiment of the present disclosure.

FIG. 3 is a flowchart showing a method for providing a mapping pseudo-hologram using individual video signal output according to an embodiment of the present disclosure.

Referring to FIG. 3, the server 1 according to an embodiment of the present disclosure may receive coordinates of a user's position from the HMD device 2 and create a partial viewpoint video based on the received coordinates (S301).

Herein, the partial viewpoint video refers to a portion including a character in a virtual reality content which corresponds to a first user's viewpoint and is created based on real-time tracking values of the HMD device 2.

Herein, the first user refers to a user who uses the HMD device 2 and a second user refers to a third person who watches a pseudo-hologram.

The server 1 creates a video to be projected onto the hologram screen 3 using the partial viewpoint video, and first creates hologram viewpoint data. Herein, the hologram viewpoint data refer to partial viewpoint videos produced from various viewpoints to implement a three-dimensional pseudo-hologram.

Then, the server 1 creates a pseudo-hologram video including objects displayed in the partial viewpoint video (S302).

In process S302, the objects refer to object which can be seen by the first user, and some of the objects may be filtered using tagged visible parameters of the respective objects as objects to be displayed in a pseudo-hologram.

Further, the filtered objects may be visualized using their own visible enchant parameters as a pseudo-hologram which can be seen by the second user.

Herein, the hologram video may also be overlaid on the first user using the HMD device 2, and, thus, the first user can be seen from the second user's viewpoint.

Finally, the server 1 may project the pseudo-hologram video onto the hologram screen 3 (S303).

The hologram screen 3 that has received the pseudo-hologram video data from the server 1 may convert the pseudo-hologram video data into a pseudo-hologram to be visually seen, and, thus, the second user can see the pseudo-hologram.

FIG. 4A to FIG. 5C show examples of the application of a mapping pseudo-hologram using individual video signal output according to an embodiment of the present disclosure.

Figure 4C:
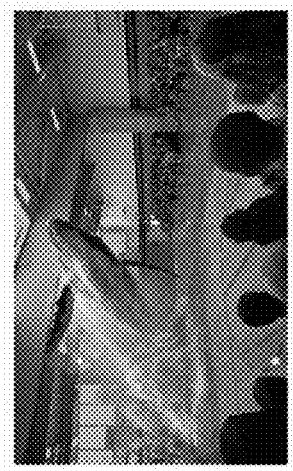
FIG. 4A to FIG. 5C show examples of the application of a mapping pseudo-hologram using individual video signal output according to an embodiment of the present disclosure.
Figure 4B:
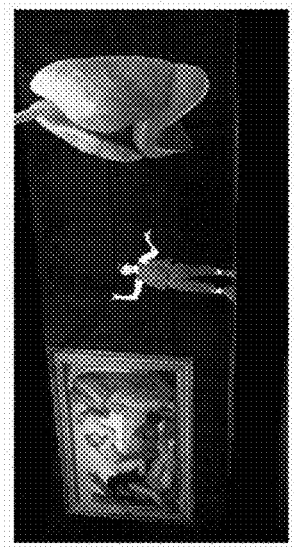
Figure 4A:
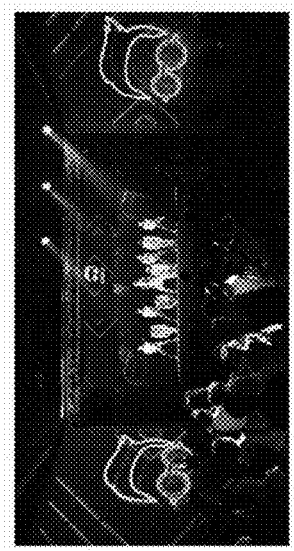

Referring to FIG. 4A to FIG. 4C, a FIG. 4A shows a holographic performance integrated with VR. The FIG. 4A shows an example where performers are not present on a real stage but the performers presented on the hologram screen 3 can give a performance.

A FIG. 4B shows an example of an education system using hologram VR technologies in which a lecture is delivered by presenting a material or a lecturer suitable for the subject of a lecture in a pseudo-hologram.

A FIG. 4C shows an example of mixed reality (MR) implemented by applying the present disclosure in which a pseudo-hologram is presented in the real world, and a lot of micro hologram screens 3 may be needed to do so.

Figure 5C:
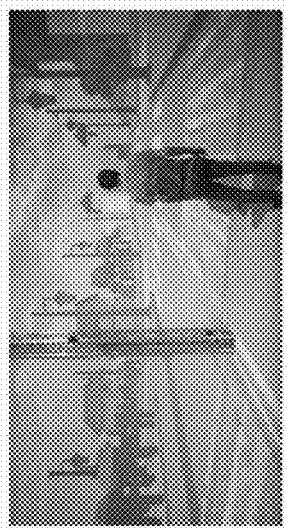
Figure 5B:
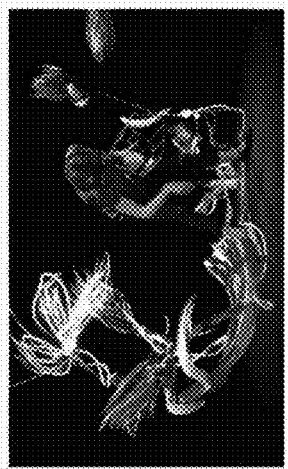
Figure 5A:
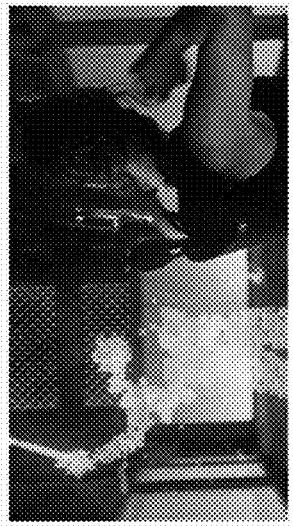

Referring to FIG. 5A to FIG. 5C, A FIG. 5A shows a game using a pseudo-hologram. The FIG. 5A shows an example where a pseudo-hologram is presented around a player, which is used in a game.

A FIG. 5B shows an example of hologram VR drawing using a hardware control device capable of directly modeling a hologram. A user performs modeling of a pseudo-hologram in real time using the control device as if the user is drawing a picture.

A FIG. 5C shows an example where a room is decorated or an outer wall is artistically painted using hologram technologies.

The embodiment of the present disclosure can be embodied in a storage medium including instruction codes executable by a computer such as a program module executed by the computer. A computer-readable medium can be any usable medium which can be accessed by the computer and includes all volatile/non-volatile and removable/non-removable media. Further, the computer-readable medium may include all computer storage media. The computer storage media include all volatile/non-volatile and removable/non-removable media embodied by a certain method or technology for storing information such as computer-readable instruction code, a data structure, a program module or other data.

The method and system of the present disclosure have been explained in relation to a specific embodiment, but their components or a part or all of their operations can be embodied by using a computer system having general-purpose hardware architecture.

The above description of the present disclosure is provided for the purpose of illustration, and it would be understood by a person with ordinary skill in the art that various changes and modifications may be made without changing technical conception and essential features of the present disclosure. Thus, it is clear that the above-described examples are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

I claim:

1. A method for presenting a mapping pseudo-hologram using individual video signal output of a real-time engine, the method comprising:
   (a) creating a partial viewpoint video including a character of a virtual reality content corresponding to a first user through a camera positioned at any one point in the virtual reality content;
   (b) creating a hologram video including at least one of objects around the character in the partial viewpoint video; and
   (c) projecting the hologram video onto a transflective hologram screen placed between the first user and a second user different from the first user,
   wherein, in the process (a), a position of the camera is changed based on a coordinate value of the first user,
   wherein the coordinate value for sensing a position of the first user is obtained from a head mounted display device worn on the first user's head,
   wherein, in the process (b), the partial view point video includes: a plurality of partial viewpoint videos produced from various viewpoints, and the hologram video to be projected onto the transflective hologram screen is created by the plurality of partial viewpoint videos to implement a three-dimensional pseudo-hologram,
   wherein, in the process (b), some of the objects are filtered as objects to be included in the hologram video, based on a predetermined value, the filtered objects are visualized based on input data of the first user, and
   wherein, in the process (c), the hologram video is projected to be overlaid on the first user when the second user sees the first user.

2. A non-transitory computer-readable storage medium that stores a program for performing a method for presenting a mapping pseudo-hologram using individual video signal output of a real-time engine of claim 1.

3. A server for presenting a mapping pseudo-hologram using individual video signal output of a real-time engine, the server comprising:
   a memory that stores at least one program; and
   a processor configured to execute the program,
   wherein the program includes:
     (a) creating a partial viewpoint video including a character of a virtual reality content corresponding to a first user through a camera positioned at any one point in the virtual reality content;

(b) creating a hologram video including at least one of objects around the character in the partial viewpoint video; and
(c) projecting the hologram video onto a transflective hologram screen placed between the first user and a second user different from the first user,
wherein, the process (a), a position of the camera is changed based on a coordinate value of the first user,
wherein the coordinate value for sensing a position of the first user is obtained from a head mounted display device worn on the first user's head,
wherein, in the process (b), the partial view point video includes: a plurality of partial viewpoint videos produced from various viewpoints, and the hologram video to be projected onto the transflective hologram screen is created by the plurality of partial viewpoint videos to implement a three-dimensional pseudo-hologram,
wherein, the process (b), some of the objects are filtered as objects to be included in the hologram video, based on a predetermined value, the filtered objects are visualized based on input data of the first user, and
wherein, the process (c) includes instructions to project the hologram video to be overlaid on the first user when the second user sees the first user.

* * * * *